Sept. 24, 1929.  F. B. NEWELL  1,729,294
INSTRUMENT FOR TESTING THE CAPACITY OF THE LUNGS
Filed Nov. 13, 1926
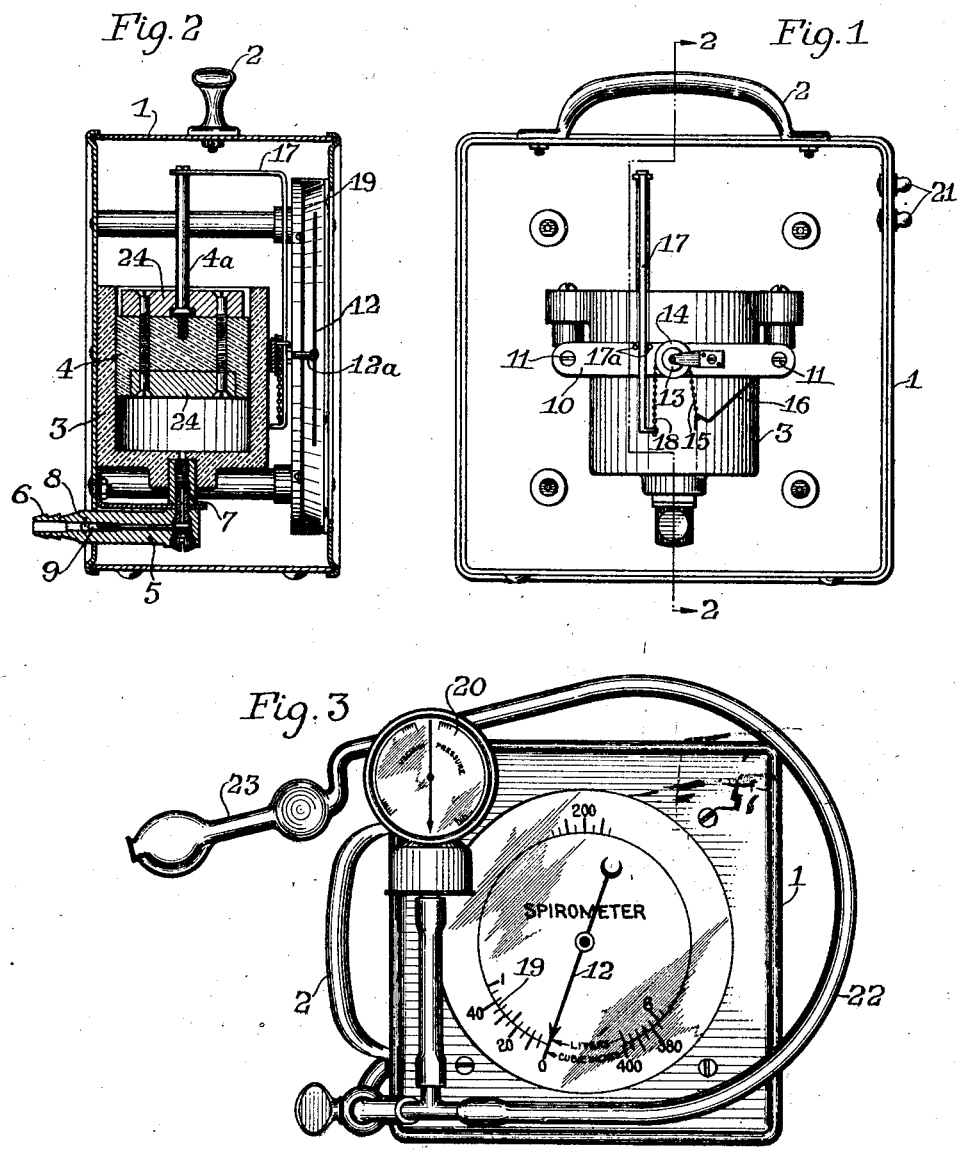
INVENTOR:
Floyd B. Newell
BY Alfred Berger
his ATTORNEY Patented Sept. 24, 1929

1,729,294

UNITED STATES PATENT OFFICE

FLOYD B. NEWELL, OF ROCHESTER, NEW YORK, ASSIGNOR TO TAYLOR INSTRUMENT COMPANIES, OF ROCHESTER, NEW YORK, A CORPORATION OF NEW YORK

INSTRUMENT FOR TESTING THE CAPACITY OF THE LUNGS

Application filed November 13, 1926. Serial No. 148,270.

This invention relates to an instrument for testing the capacity of the lungs. Instruments of this type, generally referred to as spirometers, may be constructed in many ways and, in fact, a relatively large number of different forms have been proposed in the past.

While there is naturally a great deal of latitude in the selection of mechanism for measuring the volume of air inhaled or exhaled by a person, various practical requirements and essentials actually materially limit the number of useful embodiments.

Thus for practical reasons, a serviceable instrument should be small, light and portable; should be precise in its indications; should start easily and without lagging; should stop instantly when the inhaling or exhaling action ceases; should offer a small resistance to the inhaling or exhaling action; should require only a short time, say 15–20 seconds to execute the measuring operation; and, finally, should provide facilities for quickly resetting the instrument.

None of the instruments of the prior art, to my knowledge, satisfied all these various requirements or even a majority thereof.

It is the general object of this invention to provide a spirometer which meets every one of the practical requirements above discussed.

For a full description of the invention, reference is made to the accompanying drawings, in which—

Fig. 1 is a front elevation of an instrument embodying the invention, the cover and scale being removed to expose the mechanism;

Fig. 2 is a section substantially on line 2—2, Fig. 1; and

Fig. 3 is an elevation of the instrument ready for use.

The housing 1 of the instrument is preferably square as shown in Fig. 1 and is provided with a grip portion 2.

The mechanism includes principally a cylinder 3, a piston 4, a blow tube 5 and means for indicating the movement of the piston. The cylinder 3 and the piston are made of a composition of a phenolic condensation product, such as bakelite, and graphite which does not require lubrication and permits the use of very small clearances. The leakage is thereby decreased to a negligible amount without causing excessive friction. Since the material is non-corrosive, no increase of friction is occasioned by atmospheric influences.

The blow tube 5 is connected at its inner end to the space defined by the cylinder and the inner end of the piston and its outer end is provided with a nipple 6 for receiving a rubber tube. The passage between the nipple and the inner end is controlled by a small orifice 7, preferably in the form of a tiny jewel having a hole of about .014" in diameter and by a relatively large orifice 8 immediately behind the nipple 6, communicating with the atmosphere. The orifices 8 and 7 are proportioned so that only a small percentage of the gas entering through the nipple end is passed to the interior of the cylinder. While there is no reason for selecting any particular proportion, the ratio decided upon is about 98% and 2% for the volumes passing out of orifice 8 and orifice 7 respectively. The jewel has such a highly polished surface that dust and moisture do not readily adhere to it. The jewel orifice is instrumental in maintaining an orifice of such small magnitude in permanent working order.

The orifice 8 may be adjusted by means of a threaded sleeve 9 in the passage of the blow tube. By moving the sleeve toward the orifice 8, the effective aperture of the latter is decreased.

The cylinder 3 is supported upon studs projecting from the back of the casing and a plate 10 secured to the studs by means of screws 11 forms a support for the indicating mechanism. The latter includes a pointer 12 the shaft 12$^a$ of which is secured to a pair of pulleys 13 and 14 which in turn are pivotally secured as a unit to the plate 10. One of the pulleys which in the particular case illustrated is the smaller pulley 13 carries a fine chain 15 or the like connected with the free end of a spring 16. The spring 16 thus tends to unwind the chain 15 from its pulley or sheave 13.

To the piston rod 4$^a$ is connected an angular bar or rod 17, the major portion of which extends substantially parallel to the axis of the cylinder 3. To the free end of the rod 17 is attached a fine chain 18 connected to the larger pulley 14. The spring 16 tends to wind up the chain 18 or the pulley 14. The movement of the rod 17 is laterally limited by pins 17$^a$ or the like. In front of the pulleys 13, 14 and about the shaft 12$^a$ as center is disposed a scale 19, which may be graduated in cubic inches or liters or both, as shown.

In practice it is advisable to use a manometer 20 for observing the blow pressure. As a simple means for attaching the manometer 20 to the casing, the latter is provided with a pair of studs 21. The manometer is connected to a tube 22 which is connected at one end to the nipple 6 and at its free end has a mouth piece 23. The latter is preferably of special construction preventing moisture and water from getting into the instrument.

The operation is as follows:—

The person under examination blows into the mouthpiece. The air then passes through the nipple 6 and the greater part flows out through the orifice 8 while the balance passes on through the small orifice 7 into the cylinder and filling the latter moves the piston outwardly. As the piston moves outwardly, the resulting slack of chain 18 is taken up on the pulley 14 due to the action of spring 16 and the pointer 12 assumes a corresponding position. The greater the capacity of the lungs, the greater is the outward movement of the piston and the greater the movement of the pointer, as is readily understood. While the instrument is carried in the position shown in Fig. 1, the tests are made with the cylinder in horizontal position. The sole force opposing movement of the piston is the friction between the cylinder and the piston. Due to the particular composition used, this resistance is very small and is readily compensated for by means of the spring 16. The force of the latter may, in fact, be so chosen as to almost counterbalance or neutralize the friction. In consequence the piston is highly responsive to very slight changes of pressure in the cylinder. It starts to move as soon as a person begins to blow into the tube and, what is equally important, movement of the piston ceases as soon as the blowing stops.

The orifice 7 of the jewel is preferably so chosen that at a blow pressure of 20 m. m. of mercury the pointer will move to the end of the scale in about 15–20 seconds when 400 cubic inches of air are blown into the blow tube. Generally expressed, the blow time depends upon the actual sizes of the orifices 7 and 8, principally the orifice 7. The larger the latter, the shorter the blow time and vice versa. It is very easy to maintain a uniform pressure by blowing at the proper rate to keep the pointer on the corresponding point of the manometer scale.

To reset the instrument, it is only necessary to change the position of the instrument so that the piston will move by gravity to its innermost position. To facilitate the resetting operation, portions of lead 24 or the like are preferably incorporated in the piston, as indicated in Fig. 2.

In the foregoing I have described what I at present consider as a preferred embodiment of the invention. It should be understood that the form of the mechanism for translating the movement of the piston to indicate the extent thereof may be varied in many ways within the scope of invention.

I claim as my invention:—

1. The combination of a cylinder, a piston freely movable therein, a fluid conduit leading to the closed space defined by the cylinder and the inner end of the piston and having an orifice to allow fluid to flow out of the conduit, and means for indicating the movement of the piston.

2. The combination of a cylinder, a piston freely movable therein, a fluid conduit leading to the closed space defined by the cylinder and the inner end of the piston and having an orifice to allow fluid to flow out of the conduit, means for varying the effective aperture of said orifice and means for indicating the movement of the cylinder.

3. The combination of a cylinder, a piston freely movable therein, a fluid conduit leading to the closed space defined by the cylinder and inner end of the piston and having an orifice opening from the conduit to the atmosphere and a constricted portion between the inner end of the conduit and the said orifice, and means for indicating the movement of the piston.

4. The combination of a cylinder, a piston freely movable therein, a fluid connection leading to the closed space defined by the cylinder and the inner end of the piston and having an orifice opening from the conduit to the atmosphere, and a constricted portion between the inner end of the conduit and the said orifice, said constricted portion being provided by a perforated jewel, and means for indicating the movement of the piston.

5. The combination according to claim 4 wherein the jewel defines a passage of the order of .014″ and the said orifice is proportioned to allow about 98% of a fluid entering the conduit to pass out into the atmosphere and about 2% to pass through the constricted portion into the cylinder.

6. The combination of a cylinder and a piston therein, the cylinder being normally disposed in a substantially horizontal position, a fluid connection leading to the closed space defined by the cylinder and the inner end of the piston and having an orifice to allow fluid to flow out of the conduit, and means for indicating the movement of the piston.

7. The combination according to claim 6, wherein the contacting surfaces of the cylinder and the piston are defined by a composition of the order of a phenolic condensation product and graphite and the piston is loaded with a heavy material.

In testimony whereof I affix my signature.

FLOYD B. NEWELL.